United States Patent
Yang et al.

(10) Patent No.: US 11,055,661 B1
(45) Date of Patent: Jul. 6, 2021

(54) WAREHOUSE INVENTORY ITEM LOCATION CONSOLIDATIONS BASED ON REAL-TIME VOLUMETRIC SPACE UTILIZATION

(71) Applicant: Coupang Corp., Seoul (KR)

(72) Inventors: Byung Suk Yang, Seoul (KR); Dae Yong Jang, Seoul (KR); So Hee Kim, Seoul (KR); Seon Sook Hong, Seoul (KR); Myung Soo Song, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/010,724

(22) Filed: Sep. 2, 2020

(30) Foreign Application Priority Data

Feb. 17, 2020 (KR) .......................... 10-2020-0019123

(51) Int. Cl.
*G06Q 10/08* (2012.01)
*G06Q 10/06* (2012.01)

(52) U.S. Cl.
CPC ..... *G06Q 10/087* (2013.01); *G06Q 10/06311* (2013.01)

(58) Field of Classification Search
CPC .......... G06Q 10/087; G06Q 10/06311; G06Q 20/203; G06Q 50/28; G06Q 10/08
See application file for complete search history.

(56) References Cited

U.S. PATENT DOCUMENTS

| | | | | |
|---|---|---|---|---|
| 6,144,945 | A * | 11/2000 | Garg | G06Q 10/087 705/28 |
| 6,315,513 | B1 * | 11/2001 | Harukawa | B65G 61/00 414/281 |
| 6,341,271 | B1 * | 1/2002 | Salvo | G06Q 10/087 705/28 |
| 7,669,763 | B2 * | 3/2010 | Ernesti | G06Q 20/203 235/385 |
| 7,770,792 | B2 * | 8/2010 | Bruns | G06Q 10/087 235/385 |

(Continued)

FOREIGN PATENT DOCUMENTS

| | | |
|---|---|---|
| JP | S61-257802 A | 11/1986 |
| JP | H04-80103 A | 3/1992 |

(Continued)

OTHER PUBLICATIONS

Oracle Warehouse Management—User's Guide—Release 11i Oracle, May 2002 (Year: 2002).*

(Continued)

*Primary Examiner* — Scott L Jarrett
(74) *Attorney, Agent, or Firm* — Knobbe, Martens, Olson & Bear, LLP

(57) ABSTRACT

The present disclosure provides an electronic apparatus for inventory management and an operation method thereof. The operation method includes receiving a consolidation task request, identifying, in response to the received consolidation task request, information on at least one item based on an item space usage rate for each zone calculated in real time, wherein the at least one item is a target on which a picking task is to be performed, transmitting the information on the at least one item to a terminal, receiving a picking task result of the at least one item from the terminal, and updating information on inventory based on the picking task result.

13 Claims, 15 Drawing Sheets

(56) References Cited

U.S. PATENT DOCUMENTS

| | | | | |
|---|---|---|---|---|
| 7,873,549 | B1* | 1/2011 | Mishra | G06Q 10/087 705/28 |
| 7,979,359 | B1* | 7/2011 | Young | G06Q 10/06 705/332 |
| 8,401,975 | B1* | 3/2013 | Tian | G06Q 10/08 705/335 |
| 9,020,631 | B1* | 4/2015 | Bellavance | G06Q 50/28 700/216 |
| 9,495,656 | B2* | 11/2016 | Adler | G05B 13/00 |
| 10,259,648 | B2* | 4/2019 | Wolf | G06Q 50/28 |
| 2003/0171962 | A1* | 9/2003 | Hirth | G06Q 10/06315 705/7.25 |
| 2005/0284934 | A1* | 12/2005 | Ernesti | G06Q 20/203 235/385 |
| 2005/0289020 | A1* | 12/2005 | Bruns | G06Q 10/08 705/28 |
| 2006/0287939 | A1* | 12/2006 | Harel | G06Q 20/203 705/37 |
| 2008/0255968 | A1* | 10/2008 | Heinrichs | G06Q 10/087 705/28 |
| 2009/0169352 | A1* | 7/2009 | Knipfer | G06Q 10/087 414/801 |
| 2013/0226649 | A1* | 8/2013 | Grissom | G06Q 10/087 705/7.25 |
| 2014/0012612 | A1* | 1/2014 | Abdic | G06Q 10/04 705/7.12 |
| 2014/0089032 | A1* | 3/2014 | Bell | G06Q 10/06313 705/7.24 |
| 2014/0114814 | A1* | 4/2014 | Lindau | G06Q 10/087 705/28 |
| 2015/0307278 | A1* | 10/2015 | Wickham | G05B 15/02 700/216 |
| 2016/0060032 | A1 | 3/2016 | Kim et al. | |
| 2018/0108102 | A1* | 4/2018 | Kapuria | G06Q 50/28 |
| 2018/0181909 | A1* | 6/2018 | Wilkinson | G06Q 10/0833 |
| 2018/0260770 | A1* | 9/2018 | Ramirez | G05B 19/4183 |
| 2020/0039747 | A1* | 2/2020 | Ahmann | G05B 19/41895 |

FOREIGN PATENT DOCUMENTS

| | | |
|---|---|---|
| JP | H05-201503 A | 8/1993 |
| JP | H10-109712 A | 4/1998 |
| JP | H10-167421 A | 6/1998 |
| JP | H10-167422 A | 6/1998 |
| JP | H11-165815 A | 6/1999 |
| JP | 2002-308406 A | 10/2002 |
| JP | 2005-255390 A | 9/2005 |
| JP | 2007-186320 A | 7/2007 |
| JP | 2010-515967 A | 5/2010 |
| JP | 2018-116533 A | 7/2018 |
| JP | 2019-531990 A | 11/2019 |
| JP | 2020-128266 A | 8/2020 |
| KR | 10-1551291 B | 9/2015 |
| KR | 10-2016-0027840 A | 3/2016 |
| WO | WO 2008-085628 A2 | 7/2008 |
| WO | WO 2018/038816 A1 | 3/2018 |

OTHER PUBLICATIONS

Oracle Warehouse Management—User's Guide—Release 11i Oracle, Mar. 2005 (Year: 2005).*

Dynamics 365—Warehouse management overview Microsoft, Apr.-Jul. 2020 (Year: 2020).*

* cited by examiner

FIG. 4

| Inventory > Consolidation plan > Display space goal setting | | | |
|---|---|---|---|
| All zone types PICKING | › | | Q Search |

| Zone name | Display space goal | Change display space goal | |
|---|---|---|---|
| A | 20% | 20% ∨ | Store |
| AA | 15% | 15% ∨ | Store |
| B | 25% | 25% ∨ | Store |
| BB | 15% | 15% ∨ | Store |
| BSA | 15% | 15% ∨ | Store |
| C | 15% | 15% ∨ | Store |
| CC | 15% | 15% ∨ | Store |
| D | Unsettled | fillrate ∨ | Store |
| E | Unsettled | fillrate ∨ | Store |
| E1 | Unsettled | fillrate ∨ | Store |

400
401
402

(a) (b) (c)

(d) (e)

(f)

(g)

(h)

(i)

(j)

WAREHOUSE INVENTORY ITEM LOCATION CONSOLIDATIONS BASED ON REAL-TIME VOLUMETRIC SPACE UTILIZATION

BACKGROUND

Technical Field

This disclosure relates to an electronic apparatus for inventory management and an operation method thereof.

Description of the Related Art

Systems for storing and managing items to be shipped to customers upon placement of an order are of increasing importance in today's economic growth. New products are developed continuously, and many products are released on the market in real time. While this growth provides consumers with more choices of goods and services, many companies involved in such businesses (e.g., retail stores, wholesale stores, etc.) have difficulties in storing and managing rapidly increasing items.

In order to utilize space efficiently, in a physical location (for example, a fulfillment center) where items are stored, a task called consolidation is required to move items already on display from a location to another location. The consolidation task may be performed to compress two or more locations having items with low space usage rates into one location, move an item with a high order rate to a place to be picked easily, or move an item with a low order rate to a separate place. A typical consolidation task may be performed using a stock transfer tool in a non-trackable state according to a manual. Thus, an automation of the consolidation task may be required.

SUMMARY

Technical Goals

An aspect provides an electronic apparatus for inventory management and an operation method thereof. Technical goals to be achieved through the example embodiments are not limited to the technical goals as described above, and other technical tasks can be inferred from the following example embodiments.

Technical Solutions

According to an aspect, there is provided an operation method of an electronic apparatus for inventory management, the method including receiving a consolidation task request, identifying, in response to the received consolidation task request, information on at least one item based on an item space usage rate for each zone calculated in real time, wherein the at least one item is a target on which a picking task is to be performed, transmitting the information on the at least one item to a terminal, receiving a picking task result of the at least one item from the terminal, and updating information on inventory based on the picking task result.

The information on the at least one item may include at least one of identification information, quantity information, and location information of an item on which the picking task is to be performed.

The terminal may be configured to output the information on the at least one item and verify whether the at least one item is picked by a quantity corresponding to a target quantity.

A space usage rate of the at least one item may be a ratio of a volume of a space in which an item is placed in a zone to a volume of a space capable of receiving an item in the zone, and be changed in accordance with a picking task being performed on the item in the zone.

The receiving of the consolidation task request may include receiving information on a plurality of locations in which a consolidation task is required. The identifying may include comparing an item space usage rate for each of the plurality of locations to a predetermined value and generating information on or regarding at least one item on which a picking task is to be performed.

The receiving of the consolidation task request may include receiving a target value of the item space usage rate for each zone. The identifying may include comparing the item space usage rate for each zone to the target value and generating information on at least one item on which a picking task is to be performed.

The terminal may be configured to request to input identification information of a first location in which a first item among the at least one item is placed, and request, when an input indicating that the identification information of the first location is not to be input is received, to input identification information of a second location in which the first item is placed, the second location being different from the first location.

The terminal may be configured to request to input identification information of a first item among the at least one item at a first location in which the first item is placed, and request, when an input indicating that the identification information of the first item is not to be input is received, to input identification information of a second location in which the first item is placed, the second location being different from the first location.

The terminal may be configured to request to input a picking quantity of a first item among the at least one item at a first location in which the first item is placed, and request, when an input indicating that the picking quantity of the first item does not correspond to a target quantity is received, an input of terminating a consolidation task or request to input identification information of a second location in which the first item is placed, the second location being different from the first location.

The terminal may be configured to request to input a picking quantity of a first item among the at least one item at a first location in which the first item is placed, and request, when an input indicating that the picking quantity of the first item corresponds to a target quantity is received, an input of terminating a consolidation task or request to input identification information of a second item that belongs to the at least one item and differs from the first item.

According to another aspect, there is also provided an electronic apparatus for inventory management, the apparatus including a communication device and a controller configured to control the communication device, wherein the controller is configured to receive a consolidation task request through the communication device, identify, in response to the received consolidation task request, information on at least one item based on an item space usage rate for each zone calculated in real time, wherein the at least one item is a target on which a picking task is to be performed, transmit the information on the at least one item to a terminal through the communication device, receive a picking task result of the at least one item from the terminal through the communication device, and update information on inventory based on the picking task result.

According to another aspect, there is also provided an operation method of a terminal for inventory management, the method including receiving a consolidation task request, transmitting the consolidation task request to an electronic apparatus, receiving information on at least one item based on an item space usage rate for each zone calculated in real time from the electronic apparatus in accordance with the consolidation task request, wherein the at least one item is a target on which a picking task is to be performed, receiving a picking task result of the at least one item based on the received information on the at least one item, and transmitting the received picking task result of the at least one item to the electronic apparatus.

According to another aspect, there is also provided a terminal for inventory management, the terminal including a communication device, an input device, and a processor operably coupled to the communication device and the input device, wherein the processor is configured to receive a consolidation task request, transmit the consolidation task request to an electronic apparatus through the communication device, receive information on at least one item based on an item space usage rate for each zone calculated in real time from the electronic apparatus through the communication device in accordance with the consolidation task request, wherein the at least one item is a target on which a picking task is to be performed, receive input of a picking task result of the at least one item based on the received information on the at least one item through the input device, and transmit the received input of the picking task result of the at least one item to the electronic apparatus through the communication device.

Specific details of example embodiments are included in the detailed description and drawings.

Effects

According to example embodiments, when setting a target value of an item space usage rate in units of a zone instead of manually performing a consolidation task using an inventory transport tool, a corresponding location may be automatically allocated in a system and thus, the consolidation task may be performed based on real-time data rather than a subjective decision made by an operator. For example, in a case of a task for compressing items in two or more locations into one location, instead of performing a consolidation task by visually checking, the location compressing task may be performed based on an item space usage rate for each zone calculated in real time. Through this, it is possible to reflect an inventory status changing in real time and increase a user's convenience.

Further, since the operator's subjective decision is not involved, items may be uniformly picked and displayed based on a record in a server. For example, instead of subjectively determining a degree of an emptiness of a space by visually checking a task location, an item space usage rate may be automatically calculated based on a location registered on a system and an SKU ID of an item stored in the location, thereby allocating a location in which a picking task is to be performed. Also, the location may be allocated such that an item with a high order rate is moved to a place where it is easy to pick or an item with a low order rate is moved to a separate place, which may enable item tracking.

Effects are not limited to the aforementioned effects, and other effects not mentioned will be clearly understood by those skilled in the art from the description of the claims.

BRIEF DESCRIPTION OF THE DRAWINGS

FIG. 4 illustrates another example of receiving a consolidation task request according to an example embodiment.

DETAILED DESCRIPTION

Figure 1:
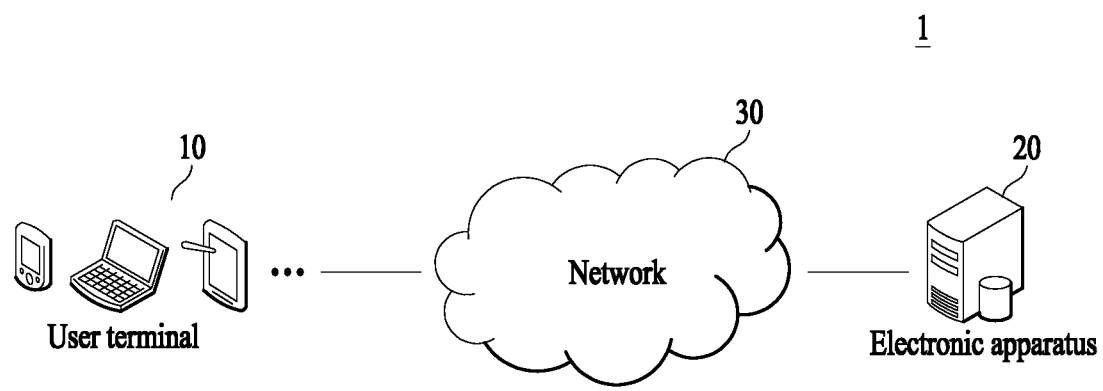
FIG. 1 illustrates an operation system for inventory management according to an example embodiment.

Terms used in the embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meanings: A alone; B alone; C alone; both A and B together; both A and C together; both B and C together; and all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, embodiments of the present disclosure will be described in detail with reference to the drawings so that those skilled in the art can easily carry out the present disclosure. The present disclosure may be embodied in many different forms and is not limited to the embodiments described herein. In the present disclosure, an item may indicate a single item, or may indicate a set of items of the same type. Also, an item may indicate a predetermined quantity of items corresponding to the same stock keeping unit (SKU). For example, an item having a specific SKU identification (ID) may indicate a predetermined quantity of items. Hereinafter, example embodiments of the present disclosure will be described with reference to the drawings.

FIG. 1 illustrates an operation system for inventory management according to an example embodiment.

An operation system for inventory management according to an example embodiment may refer to a system used for a consolidation process but is not limited thereto. As described above, the consolidation may be a task of moving inventory items already on display from a location to another location for efficient space utilization. Here, the location may belong to a zone in which an item is stored, and may be the zone and a physical location such as an aisle, a bay, a shelf, and the like included in the zone. The consolidation may be to compress items arranged in two or more locations with low space usage rates into one location. Here, the item space usage rate may be a ratio of a volume of a space in which an item is being placed to a volume of a space capable of receiving an item. Also, the item space usage rate may be a value changeable with performing a picking task on an item. As an example, when a zone includes five locations a, b, c, d, and e in which a space usage rate of an item A is ten percent (%), the item A may be gathered through the consolidation task so as to be placed in one location, for example, the location a. Through this, in the location a, the space usage rate of the item A may be 50%. Also, the item A may be removed from the remaining four locations b, c, d, and e such that the locations are to be filled with other items. Also, the consolidation may be to move an item with a high order rate, for example, a fast-selling item to a location for an operator to easily pick the item, or to move an item with a low order rate, for example, a deadwood item to a separate location. For example, the consolidation task may be performed to move the fast-selling item to medium-height shelves, or move the deadwood item to a deadwood zone. Here, the deadwood item may be an item that has not been sold within last 30 days. Classification of the fast-selling item or the deadwood item based on an item's order rate may differ for each physical location (e.g., fulfillment center) for storing items to be delivered to customers. The item's order rate may be changed based on various factors such as a season, a place, a nation, a time zone, and the like. Thus, an item with a high order rate and an item with a low order rate may not be fixed. For example, an item such as an electric fan may be classified as the fast-selling item due to the high order rate in summer and classified as the deadwood item in winter. Thus, the electric fan may be stored in different locations according to seasons.

An operation system for inventory management according to the present disclosure may be based on random stow. The random stow may refer to a method for placing various items at various locations in storage spaces arranged in rows, not a system for placing items in zones preset for the respective items. The random stow may minimize movement of a worker in inbound and outbound areas, thereby significantly reducing a work time. In addition, unlike a general fulfillment center where spaces for storing items are designated, random stow enables placement of items without leaving any space empty, and therefore, random stow is efficient in terms of space management. An operation system for inventory management according to the present disclosure may refer to a system for recommending a space for displaying an item so that the space for displaying the item can be optimized under a random stow process.

Referring to FIG. 1, an operation system for inventory management may include a user terminal 10 and an electronic apparatus 20. FIG. 1 illustrates only components of the operation system 1 related to the present embodiment. However, it is apparent to those skilled in the art that other general-purpose components may be further included in the operation system 1 in addition to the components illustrated in FIG. 1.

The user terminal 10 and the electronic apparatus 20 may communicate with each other through a network 30. The network 30 may include any one or combinations of a local area network (LAN), a wide area network (WAN), a value added network (VAN), a mobile radio communication network, and a satellite communications network. Also, the network is a comprehensive data communication network that allows network components of FIG. 1 to smoothly communicate with each other, and may include a wired Internet, a wireless Internet, and a mobile wireless communication network. The wireless communication may be, for example, wireless fidelity (Wi-Fi) LAN, Bluetooth™, Bluetooth low energy, ZigBee, Wi-Fi direct (WFD), ultra wideband (UWB), infrared Data Association (IrDA) communication, and near field communication (NFC) but not is limited thereto.

The user terminal 10 may provide a platform for inventory management. Specifically, the user terminal 10 may receive a consolidation task request from a user as an input and transmit the consolidation task request to the electronic apparatus 20. For example, the user terminal 10 may receive information on a plurality of locations in which a consolidation task is required, or receive a target value of an item space usage rate for each zone. Also, the user terminal 10 may receive information on at least one item from the electronic apparatus 20 and provide the received information to the user. Here, the at least one item may be a target on which a picking task is to be performed. For example, the user terminal 10 may output information on an item and guide the user to perform a consolidation process on inventory items to be compressed. The user terminal 10 may provide task location information and identification and quantity information of an item to be picked, to the user through an application.

The user terminal 10 may request the user to input identification information associated with an item to be picked, a storage unit from which the item is to be picked, and a location in which the item to be picked is placed. In this disclosure, a term "picking target item" may refer to an item or target on which a picking task is to be performed and also refer to an item to be picked. When the information is received from the user, the user terminal 10 may perform the consolidation process. In this case, the user terminal 10 may also request the user to input identification information associated with another location differing from the location for which the input of the identification information is requested. In some cases, the identification information may be a barcode, RFID tag data, or the like. Also, in addition to the user terminal 10 (e.g., a tablet device, a mobile device, a device such as a PDA, a computer, and the like), the identification information may be scanned or read by an automated or portable barcode scanner, RFID reader, and high speed camera, for example. Related description will be made with reference to the following drawings.

The user terminal 10 may verify whether an item is picked by a quantity corresponding to a target quantity as the consolidation task progresses. For example, the user terminal 10 may request the user to input a quantity by which an item is picked at a location where the item is placed. Hereinafter, a quantity by which an item is picked may be referred to as a "picking quantity." The user terminal 10 may request an input of terminating the consolidation task as a subsequent operation, or request the user to input identification information associated with another location differing from the location for which the input of the identification information is requested or identification information of another item differing from the item on which the picking task is performed. The user terminal 10 may then receive a picking task result of the picked item from the user and transmit the picking task result to the electronic apparatus 20.

The electronic apparatus 20 of the operation system 1 for the inventory management may receive the consolidation task request from the user terminal 10 and identify information on at least one item on which a picking task is to be performed, based on information changing in real time while the picking task is performed on the item. Related examples will be further described with reference to the drawings below. Meanwhile, the electronic apparatus 20 may receive the consolidation task request directly from the user not through the user terminal 10. In this case, the electronic apparatus 20 may receive information on a plurality of locations in which the consolidation task is required or directly receive a target value of an item space usage rate for each zone.

The user of the operation system 1 for the inventory management may identify an inventory management status using the electronic apparatus 20 in addition to the user terminal 10. The electronic apparatus 20 may provide the user with information on inventory updated in real time. For example, as the consolidation process progresses, the electronic apparatus 20 may update a consolidation plan, a consolidation status, and an error report of consolidation in real time based on a picking task result received from the user terminal 10 and provide a result of the updating to the user.

The electronic apparatus 20 of the present disclosure may be an apparatus included in a server for inventory management. When the picking tack is performed on the item in the zone, the server for inventory management may calculate the item space usage rate for each zone in real time. In response to the user picking items in locations in the zone, the item space usage rate for each zone may change in real time. Thus, even after information on an item to be picked is identified, the server for inventory management may consistently update the item space usage rate for each zone.

Figure 2:
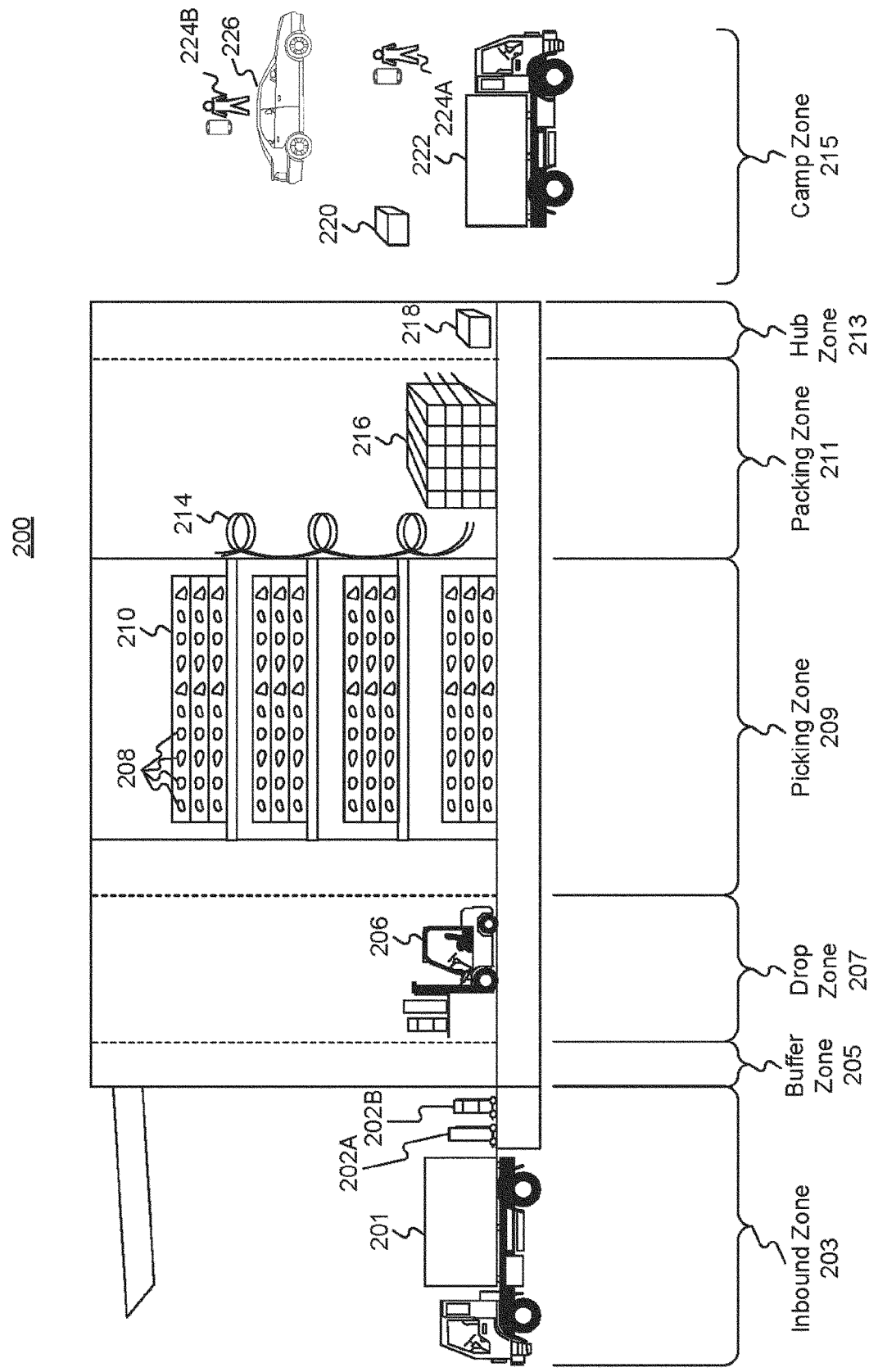
FIG. 2 is a diagram illustrating an example of a fulfillment center which is a physical location where items are stored.

FIG. 2 is a diagram illustrating an item storing space, for example, a fulfillment center (FC) 200. The FC 200 may be an example of a physical location in which items to be delivered to customers are stored. The fulfillment center 200 may be divided into a plurality of zones. The respective zones are illustrated in FIG. 2.

An inbound zone 203 may be an area in which items are received in the FC 200 from sellers. For example, a seller may send items 202A and 202B using a truck 201. The item 202A may be a single item that is sufficiently large to occupy its transport pallet. The item 202B may be a set of items stowed on the same pallet to save a room.

An operator may receive items in the inbound zone 203 and check the items for damage and accuracy. For example, the operator may compare a quantity of each of the items 202A and 202B to an ordered quantity. When the quantity matches the ordered quantity, the operator may move the items to a buffer zone 205 (for example, manually or by using a dolly, a hand truck, or a forklift truck 206). The buffer zone 205 may be, for example, a temporary storage area for items not currently needed in a picking zone 209 because there is a sufficient quantity of such items in the picking zone 209 to satisfy a predicted demand.

A drop zone 207 may be an area of the FC 200 in which the items are stored before the items are moved to the picking zone 209. An operator allocated to a picking task may access the items 202A and 202B in the picking zone 209, identify an identifier (for example, a barcode) of the picking zone 209, and identify identifiers associated with the items 202A and 202B using a mobile device (for example, the user terminal 10). Thereafter, the operator may add the items to a cart or carry the items to take the items to the picking zone 209.

The picking zone 209 may be an area of the FC 200 in which an item 208 is stored in a storage unit 210. For example, in order to generate a space for placement, a user may pick an item in the picking zone 209 in accordance with a picking plan and place the item at an allocated location in the storage unit 210. In an example, the storage unit 210 may include at least one of a physical shelf, a bookshelf, a box, a tote, a refrigerator, a freezer, a refrigerated warehouse, and the like. In another example, the picking zone 209 may be composed of a plurality of floors. In still another cases, an operator or machine may move items to the picking zone 209 manually or in various ways including, for example, a forklift, an elevator, a conveyor belt, a cart, a hand truck, a dolly, an automated robot or device, and the like.

In response to an order made by a purchaser, the operator may retrieve at least one item 208 from the storage unit 210, identify an identifier on the item 208, and place the item on a transport mechanism 214. Thereafter, the item 208 may arrive at a packing zone 211 through the transport mechanism 214.

The packing zone 211 may be an area of the FC 200 related to packaging. In the packing zone 211, the item may be received from the picking zone and packaged in a box or bag for final shipment to 209 to the purchaser. A hub zone 213 may be an area of the FC 200 in which all packages including a package 218 are received from the packing zone 211. An operator and/or machine of the hub zone 213 may search for the package 218, determine a region to which each package is to be sent among delivery regions, and route the corresponding package to an appropriate camp zone 215. In some cases, an operator or machine may identify an identifier of the package in the camp zone 215 and determine a final destination. In the example of FIG. 2, the camp zone 215 may include a truck 222, a car 226, and delivery operators 224A and 224B.

The present disclosure relates to an example of picking an item mainly in the buffer zone 205 and the picking zone 209 of the FC 200. However, it is merely an example, and the picking task may also be performed in various zones.

Figure 3:
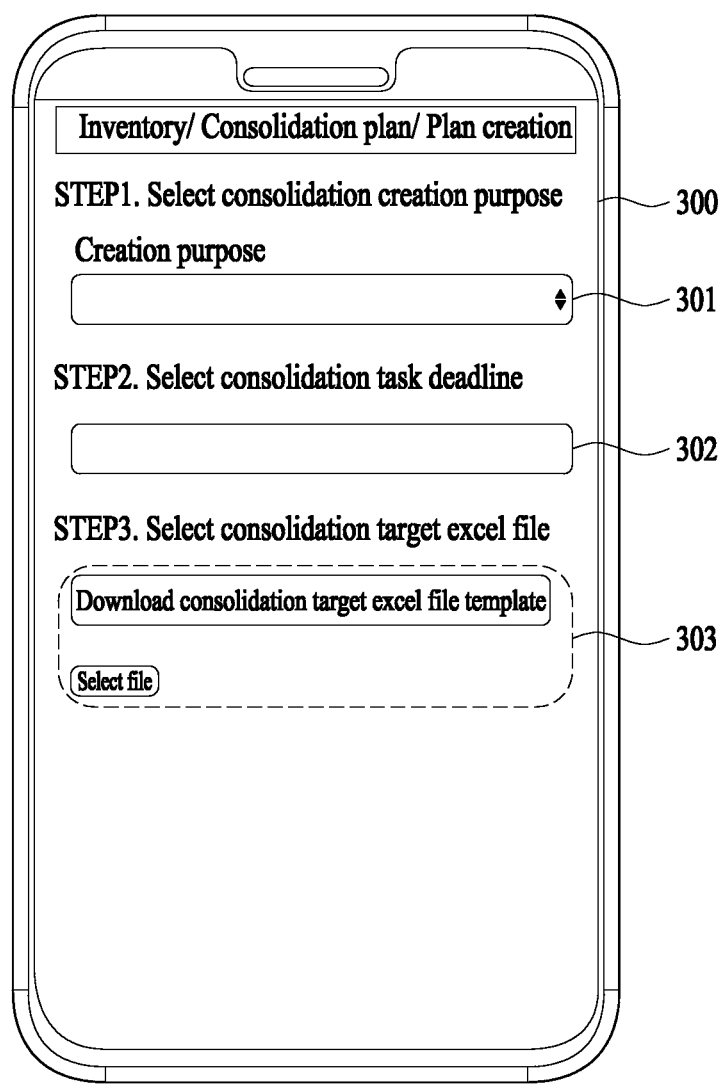
FIG. 3 illustrates an example of receiving a consolidation task request according to an example embodiment.

FIG. 3 illustrates an example of receiving a consolidation task request according to an example embodiment. Although FIG. 3 illustrates that the consolidation task request is input through the user terminal 10, it is merely an example and the consolidation task request may also be input through the electronic apparatus 20.

An operation method for inventory management of the present disclosure may receive a consolidation task request through the user terminal 10 so that the electronic apparatus 20 receives the consolidation task request from the user terminal 10. The consolidation task request may be an operation of inputting information on a plurality of locations in which a consolidation task is required. Specifically, the information on a plurality of locations in which a consolidation task is required may include information on the plurality of locations and information on an item included in each of the locations. According to an example embodiment of the present disclosure, a user may input, to the user terminal 10, item information of an item which is a target for a consolidation task and location information of a location in which the item is placed, so that the information is transmitted to the electronic apparatus 20. For example, the user may extract location information of a location in which a consolidation task target item is placed and metadata associated with the consolidation task target item in a format of a computer-readable storage medium. Also, the user may upload the extracted location information and the metadata to the electronic apparatus 20 through the user terminal 10.

As shown in a screen 300 of FIG. 3, the user may select a purpose of creating a consolidation plan. For example, in a creation purpose input field 301, a plurality of options related to the purpose of creating the consolidation plan may be popped up in a list, so that the user selects a purpose related to inventory management from the list. Thereafter, the user may set a period for terminating a consolidation task in a task deadline selecting field 302. Here, a consolidation task deadline may not be limited and, when no deadline is selected, set to a default value. For example, a default value of the task deadline may be set to 23:59 the next day.

The user may then upload the item information of the consolidation task target item and the location information of the location in which the item is placed, to a plan creation field 303 in a form of a computer-readable storage medium. The user may download a template in which consolidation task data is to be recorded from the user terminal 10 in a form of a computer-readable storage medium, for example, a file. Also, the user may record the location in which the consolidation task target item is placed and the metadata associated with the consolidation task target item in the template, and upload the template to the plan creating field 303 in a form of the computer-readable recording medium, for example, in a form of a file.

According to an example embodiment of the present disclosure, the user terminal 10 may transmit data included in the uploaded file to the electronic apparatus 20 through the network 30. Thereafter, the electronic apparatus 20 of the present disclosure may recognize information on at least one item for performing a picking task based on the received data. In this instance, the electronic apparatus 20 may compare an item space usage rate of each of the plurality of locations to a predetermined value, thereby generating the information on or regarding at least one item on which a picking task is to be performed. Here, the predetermined value may be a default value of the item space usage rate for each zone set in a server before the consolidation task request is received.

The electronic apparatus 20 may select a plurality of locations belonging to a zone of which the item space usage rate for each zone is less than or equal to the default value. Also, the electronic apparatus 20 may identify an item placed in at least one location among the plurality of locations as the at least one item on which the picking task is to be performed, thereby generating information on the item. For example, when a default value of an item space usage rate for each of zones A, B, and C is set to 10%, and the item space usage rate in the respective zones are 13%, 19%, and 7%, the picking task may be performed in the zone C of which the item space usage rate is less than the default value.

Meanwhile, through the foregoing example, the user may directly select the item on which the consolidation task is to be performed. Also, the above-described example may be efficient in working with specific types of items such as a fast-selling item and a deadwood item in addition to the purpose of creating the space for placement. When it is difficult for the user to directly extract a large amount of data, or when it is necessary to work based on real-time data by reflecting a consolidation task status, a location may be automatically allocated in the system as described below.

In another example of receiving a consolidation task request, a target value of an item space usage rate for each zone may be received from a user. A description of such will be given with reference to FIG. 4.

FIG. 4 illustrates another example of receiving a consolidation task request. Referring to FIG. 4, a user may input a target value of an item space usage rate for each zone through the user terminal 10 or the electronic apparatus 20.

As shown in a screen 400 of FIG. 4, the user may input a target value of an item space usage rate for each zone in a target value setting field 401. In this example, the target value may not be set or may be set as a default value or a previously set target value as indicated in the target value setting field 401. When the target value of the item space usage rate for each zone is input, the electronic apparatus 20 may compare the input target value to the item space usage rate for each zone, thereby generating information on at least one item on which a picking task is to be performed.

In an example, the electronic apparatus 20 may select a plurality of locations belonging to a zone of which an item space usage rate for each zone is less than or equal to the target value. Also, the electronic apparatus 20 may identify an item placed in at least one location among the plurality of locations as at least one item on which a picking task is to be performed, thereby generating information on the item. For example, when the electronic apparatus 20 receives 20% as the target value of the item space usage rate for each of zones D, E, and F, and when the item space usage rates of the respective zones are 10%, 25%, and 17%, a picking task may be performed in the zones D and F other than the zone E of which the item space usage rate is greater than the target value.

Meanwhile, in the foregoing example, the user may not directly extract data and may perform a consolidation task based on data updated by a server in real time. Also, since the consolidation task may be performed based on the real-time data instead of a subjective decision of an operator, the user's convenience may increase and an inventory status changing in real time may be reflected.

An operation method for inventory management according to an example embodiment of the present disclosure may be to plan about which item is picked in a location of which zone. Related examples will be described with reference to FIGS. 5A and 5B.

Figure 5A:
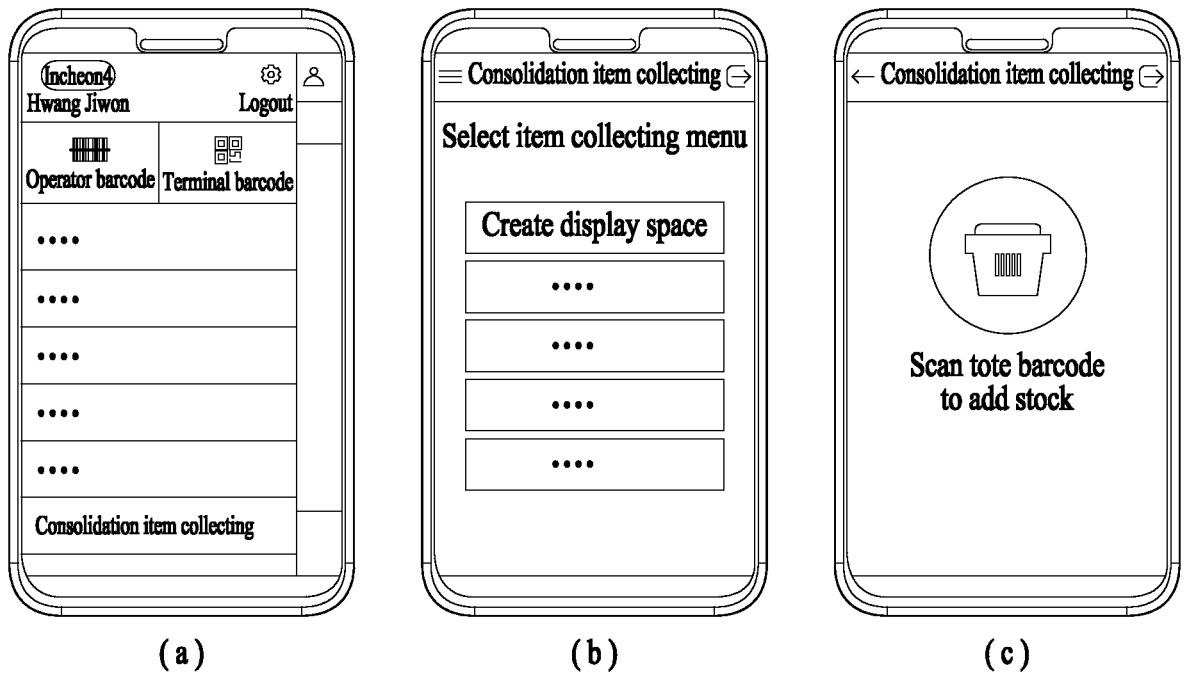
FIGS. 5A and 5B illustrate screens representing an operation method for inventory management according to an example embodiment.
Figure 5A:
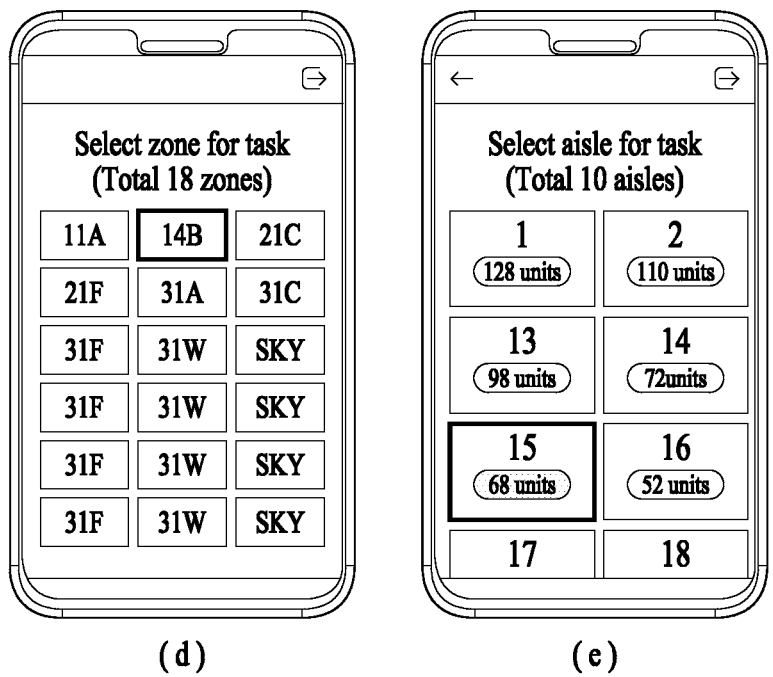
Figure 5B:
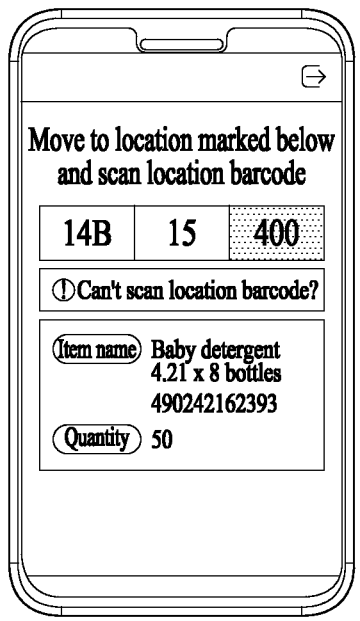
Figure 5B:
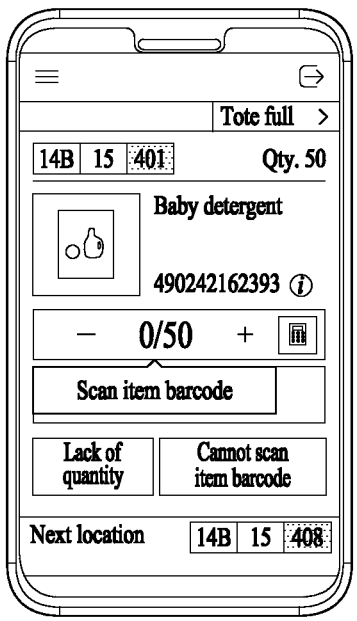
Figure 5B:
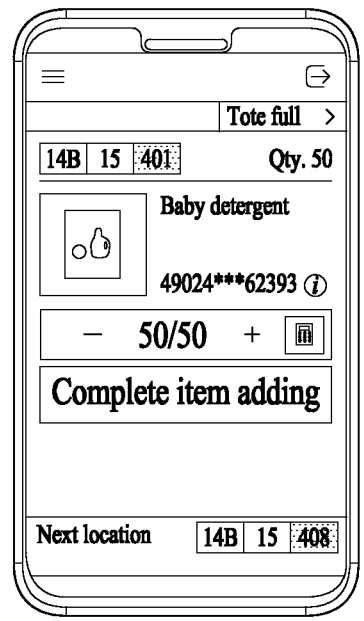
Figure 5B:
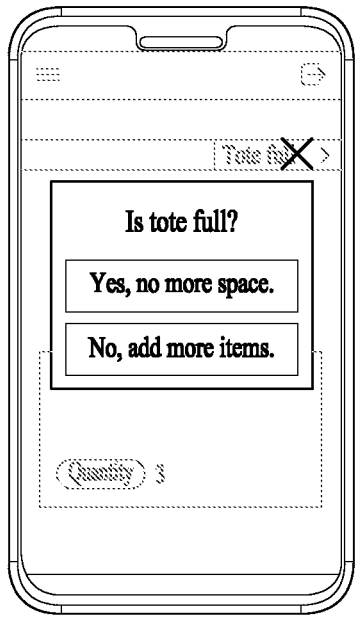
Figure 5B:
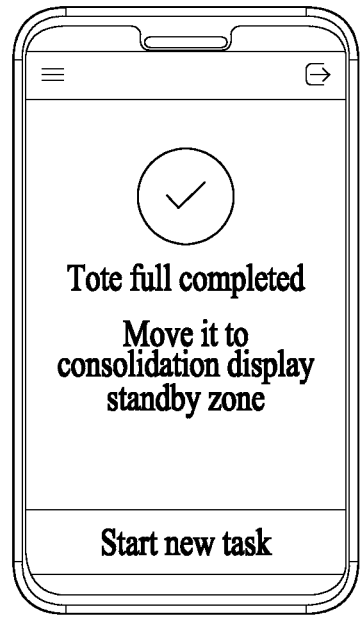

FIGS. 5A and 5B illustrate screens representing an operation method for inventory management according to an example embodiment. Specifically, (a) through (j) of FIGS. 5A and 5B represent display screens of the user terminal 10 according to an example embodiment of an operation method for inventory management. Also, in cases of FIGS. 6 through 10, for convenience of description, display screens of the user terminal 10 may be shown. For this, the user terminal 10 may include units for performing an operation, for example, a display, an input device, a communication device, a processor, and the like. Descriptions of such will be given later.

According to an example embodiment, a user may select an item related to inventory management through an application about the operation system 1 for the inventory management in the user terminal 10, and select an item for initiating a picking task as shown in (a) and (b) of FIG. 5A. Also, the user terminal 10 may receive identification information of a storage unit in which a picked item is to be added as shown in (c) of FIG. 5A. In some cases, the storage unit may include units carried by a user such as a shelf, a bookshelf, a box, a tote, and the like, for example.

In response to a consolidation task request received in advance, the user terminal 10 may output information on at least one item on which a picking task is to be performed, received from the electronic apparatus 20. For example, information on an item may include identification information, quantity information, and location information of an item on which a picking task is to be performed. Among them, from the output location information, information on a task location in which a user is to perform a picking task (hereinafter, also referred to as "task location information") may be received as shown in (d) and (e) of FIG. 5A. The task location information may correspond to information on a location in which a picking target item is placed. Also, the task location information may include detailed information on a location such as a zone in a fulfillment center in which the location corresponding to the task location information is located and an aisle included therein.

The user terminal 10 may provide a guide on the picking task based on the input task location information and output the identification information and the quantity information of the picking target item along with the task location information as shown in (f) of FIG. 5B. At this stage, the user terminal 10 may request to input identification information of a location in which a picking target item is placed. Meanwhile, when identifying the identification information of the location to input the identification information, a situation in which the identification is unavailable may occur. Related descriptions will be made with reference to FIG. 6.

Figure 6:
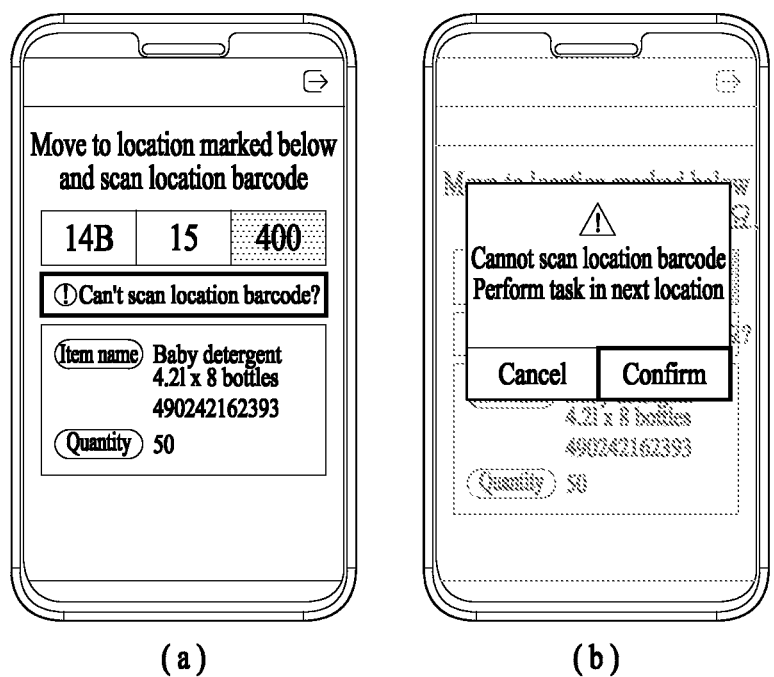
FIG. 6 illustrates an example of requesting to input identification information of a location according to an example embodiment.

FIG. 6 illustrates an example of requesting to input identification information of a location according to an example embodiment.

According to an example embodiment, when an identification of identification information of a location is unavailable as shown in (a) of FIG. 6, the user terminal 10 may transmit error information to the electronic apparatus 20. For example, when the identification is unavailable due to a damage of the identification information, the user terminal 10 may receive an input indicating that the identification information of the location is not identifiable as shown in (b) of FIG. 6 and transmit information on the location having an error to the electronic apparatus 20.

Also, in a case of receiving the input indicating that the identification information of the location is not identifiable as shown in (b) of FIG. 6, the user terminal 10 may output information on a different location and request to input identification information of the different location. The different location may be a location where the picking target item is placed and different from the location for which the input of the identification information has been requested immediately before. The different location may also be a location where the picking target item is placed and adjacent to the location for which the input of the identification information has been requested immediately before. The adjacent locations may be locations that are physically adjacent to each other, and may be locations belonging to a same area (e.g., a zone, an aisle, etc.) Hereinafter, for the term of "different location", the above description may be referenced.

When the identification information of the location is identified without occurring an error, the user terminal 10 may output the identification information and the quantity information of the item on which the picking task is to be performed as shown in (g) of FIG. 5B. The identification information the item on which the picking task is to be performed may include, for example, a name of the item, a representative image of the item, and a SKU ID. Also, the quantity information of the item for performing the picking task may include information on a target quantity.

When the identification information of the location is identified without occurring an error, the user terminal 10 may request to input the identification information of the picking target item. In this case, a situation in which the identification information of the picking target item is not identifiable and may not be input to the user terminal 10 may occur. Related descriptions will be made with reference to FIG. 7.

Figure 7:
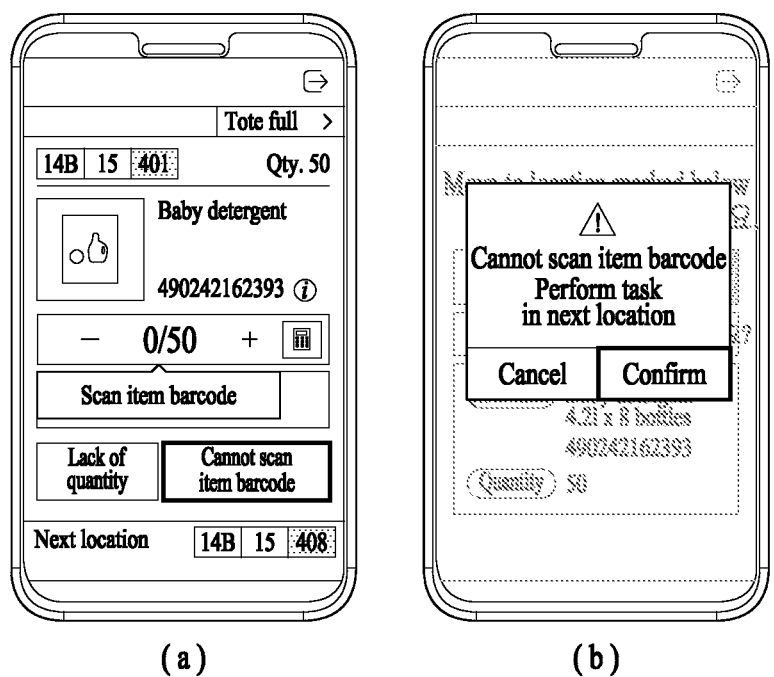
FIG. 7 illustrates an example of requesting to input identification information of an item according to an example embodiment.

FIG. 7 illustrates an example of requesting to input identification information of an item according to an example embodiment.

According to an example embodiment, when the identification information of the item is not identifiable as shown in (a) of FIG. 7, the user terminal 10 may transmit error information to the electronic apparatus 20. For example, when the identification information is damaged in a process of handling such as transporting and storing an item, an identification of the identification information may be unavailable. In this example, the user terminal 10 may receive a request indicating that the identification information of the item is not to be input as shown in (b) of FIG. 7. Also, the user terminal 10 may transmit information on an item having an error to the electronic apparatus 20.

Also, when the request indicating that the identification information of the item is not to be input is received as shown in (b) of FIG. 7, the user terminal 10 may output information on a different location and request to input identification information of the different location.

Meanwhile, when the identification information of the item is identified without occurring an error, the user terminal 10 may request to continue performing the picking task on the item in a task location. In general, one or more picking target items may be arranged in the task location, but an inventory status recorded in a server may be different from an actual inventory status. For example, there may be no item to be picked when a user arrives at the task location for the picking task. In this case, the user may not perform the picking task in the corresponding task location. Thus, an additional process for providing notification for such a situation may be required.

Figure 8:
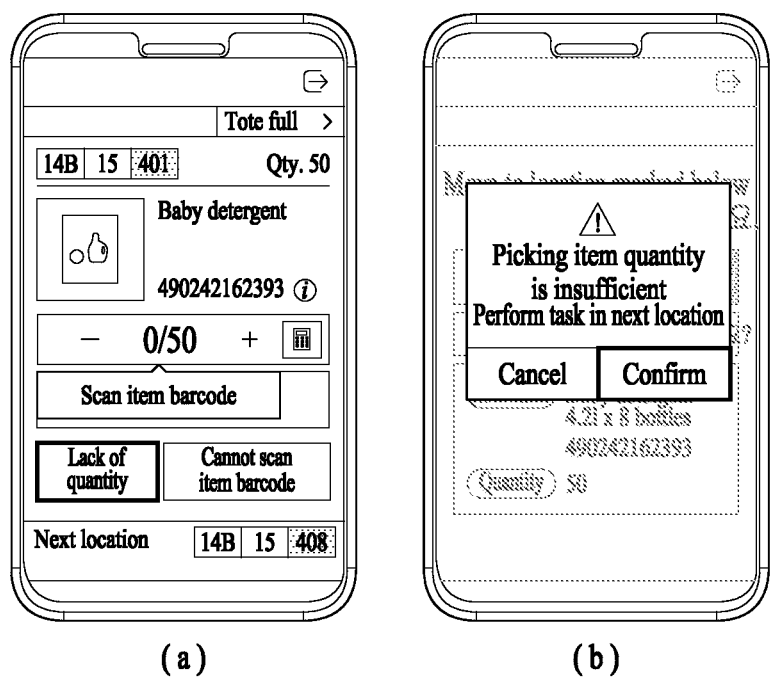
FIG. 8 illustrates an example of verifying whether a quantity by which an item is picked corresponds to a target quantity according to an example embodiment.

FIG. 8 illustrates an example of verifying whether a picking quantity of an item corresponds to a target quantity according to an example embodiment. Referring to FIG. 8, when a picking target item is absent in a task location as shown in (a) of FIG. 8, the user terminal 10 may receive an input indicating a quantity of an item placed in the task location is insufficient as shown in (b) of FIG. 8. When the input is received, the user terminal 10 may output information on a different location, thereby requesting a user to input identification information of the different location. In this case, the user may move to the different location and initiate the picking task of the picking task item again. Also, the user terminal 10 may transmit error information to the electronic apparatus 20 to deliver information indicating that the picking task of the item is unavailable.

Meanwhile, when one or more items are present in the task location, the user terminal 10 may request to input a quantity by which the picking target item is picked in the task location. In one embodiment, the user terminal 10 may receive an input indicating that the input picking quantity of the item does not correspond to a target quantity. A case in which the input picking quantity of the item does not correspond to the target quantity may be, for example, a case in which the picking of the item is unavailable due to an insufficient space of a storage unit or a case in which all items in the task location are picked but the picking quantity does not meet the target quantity. In such cases, the user may not be able to proceed with the picking task. An operation performed in such cases will be described with reference to FIGS. 9 and 10.

Figure 9:
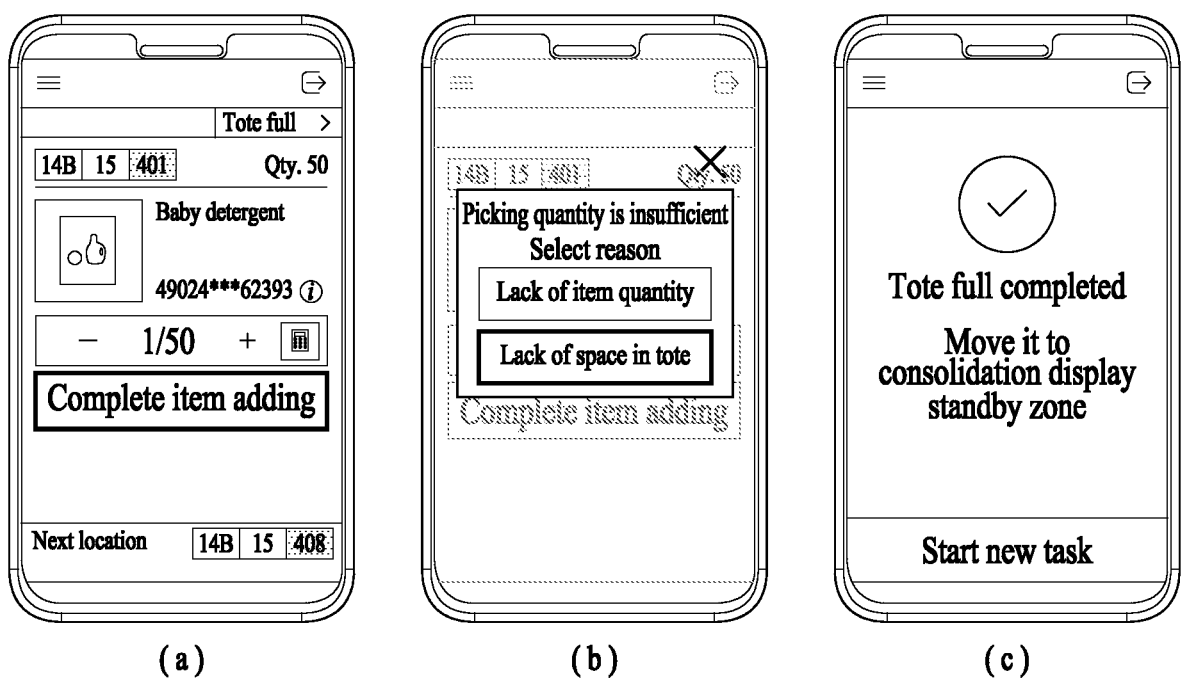
FIG. 9 illustrates another example of verifying whether a quantity by which an item is picked corresponds to a target quantity according to an example embodiment.
Figure 10:
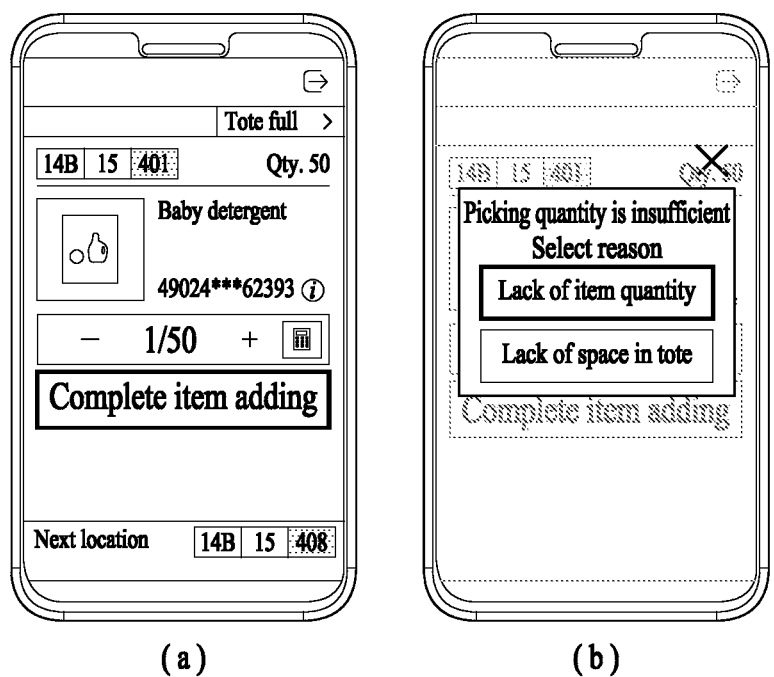
FIG. 10 illustrates still another example of verifying whether a quantity by which an item is picked corresponds to a target quantity according to an example embodiment.

FIGS. 9 and 10 illustrate examples of verifying whether a picking quantity of an item corresponds to a target quantity according to an example embodiment.

In an example, when an empty space in a storage unit is smaller than a volume of a picking target item, picking of the item may be impossible. For example, when an actual volume or packaging of the picking target item is different from a record in a server, it may be difficult to add the item of the target quantity to the storage unit. In this case, the user terminal 10 may receive an input indicating that the picking task of the item is completed as shown in (a) of FIG. 9 and receive a reason for which the picking quantity of the item does not correspond to the target quantity (for example, the insufficient space in the storage unit) as shown in (b) of FIG. 9. Also, the user terminal 10 may request an input of terminating a consolidation task as shown in (c) of FIG. 9. At this time, the storage unit in which the consolidation task is terminated may be treated as being completed even if the picking quantity of the picking target item is less than the target quantity.

In another example, even when all items in the task location have been picked, the picking quantity may not reach the target quantity. In other words, because an actual quantity of an item in the task location is not equal to a quantity recorded in a server, even when all items in the task location are picked, the picking quantity may not reach the target quantity. For example, during an inbound process, a damaged item that is not registered on the server may be placed in the task location, so an item may not be picked by a target quantity in the task location. In this case, the user may input a quantity only as much as the quantity that can be input into the user terminal 10 (that is, only the quantity actually picked). The user terminal 10 may receive an input indicating that a picking quantity of a picking target item does not correspond to the target quantity as shown in (a) of FIG. 10. Also, the user terminal 10 may receive a reason for which the picking quantity of the item does not correspond to the target quantity (for example, an insufficient quantity of the item) as shown in (b) of FIG. 10. Additionally, the user terminal 10 may request to input identification information on a different location including the picking target item and being adjacent to the location for which the input of the identification information has been requested immediately before, or transmit error information to the electronic apparatus 20.

Referring back to FIG. 5B, the user terminal 10 may receive an input indicating that the picking quantity of the picking target item corresponds to the target quantity as shown in (h) of FIG. 5B. Also, the user terminal 10 may receive a picking task result of the picking target item and transmit the picking task result to the electronic apparatus 20. For example, the user terminal 10 may receive an input indicating that the picking task is completed and no more space for adding items remains as shown in (i) of FIG. 5B. In this case, the user terminal 10 may request an input of terminating the consolidation task as shown in (j) of FIG. 5B. Meanwhile, when the storage unit corresponds to a "tote", a case in which no more space for adding items remains in the storage unit may be referred to as "tote full", which may be used as a term for informing of completion of a picking task.

When the picking target item corresponding to the target quantity is picked, and when a space remains in the storage unit, the picking task may be additionally performed. An additional picking task may be a picking task for another item scheduled for a consolidation task, and may be a picking task for an item different from the item on which the picking task is completed. For this, the user terminal 10 may request to input identification information of an item different from the picking target item. The user terminal 10 may also output location information for picking the different item.

Although it has been mentioned that the user terminal 10 mainly performs the corresponding functions relating to various embodiments of the present disclosure, the present disclosure is not limited to thereto, and the functions may also be performed by the electronic apparatus 20.

The electronic apparatus 20 of the present disclosure may receive the picking task result from the user terminal 10 and update information on inventory. Based on the picking task result, the electronic apparatus 20 may update a consolidation plan, a consolidation status, a consolidation error list, and the like in real time.

Specifically, the electronic apparatus 20 may update a proceeding status of the picking task for each metadata associated with the picking target item and the location information of the location in which the picking target item is placed so that the consolidation plan is to be verified. For example, the proceeding status of the picking task may include a picking standby status, a picking status, a picking-completed status, a picking terminating status, and a picking-suspended status. The picking standby status may indicate a case in which a user has not yet started picking after the consolidation plan is generated. The picking status may indicate a case in which one or more items are picked after the consolidation plan is generated. The picking-suspended status may indicate a case in which the user notifies a suspension of the picking through the user terminal 10 or the electronic apparatus 20 in the picking-standby or picking status. The picking-completed status may indicate a case in which an item is picked by a quantity corresponding to a target quantity. The picking-terminating status may indicate a case in which a picking deadline (for example, a task deadline) has arrived while the picking is not completed.

The electronic apparatus 20 may update a picking and display status for each storage unit so as to track the storage unit in which a picking target item is picked and stored. For example, the picking and display status may include a picking status, a display standby status, a displaying status, and a display-completed status. The picking status may indicate a state in which one or more items are added to the storage unit and the storage unit has a space for the items. The display standby status may indicate a state of waiting for displaying because the storage unit has no more space for adding an item. The displaying status may indicate a state in which a display task has been actually completed but information on the completion is not transmitted to a server. The display-completed status may indicate a state in which the storage unit on which the picking task has been completed is displayed. Also, the electronic apparatus 20 may output picking and display status information for each storage unit based on the updated picking and display status. For example, for each storage unit, information on a picking quantity of a picking target item, a status of the storage unit, a picking task processing time, an operator, and the like may be output.

The electronic apparatus 20 may update the error information received from the user terminal 10 in a consolidation error list. As described with reference to FIGS. 6 through 8 and 10, the electronic apparatus 20 may receive the error information from the user terminal 10 in various error situations. For example, a case in which the identification information of the location is not identifiable, a case in which the identification information of the item is not identifiable, a case in which a picking target item is absent in the task location, and a case in which all items in the task location have been picked but a picking quantity does not reach a target quantity may correspond to the error situation. Such error information may include information associated with an error report date and time, an error type, information on a location and item in which an error occurs (metadata, an identifier, an item name, etc.) and a quantity with problems, for example.

Hereinafter, an operation method for inventory management of the present disclosure will be described in detail with reference to the following flowcharts.

Figure 11:
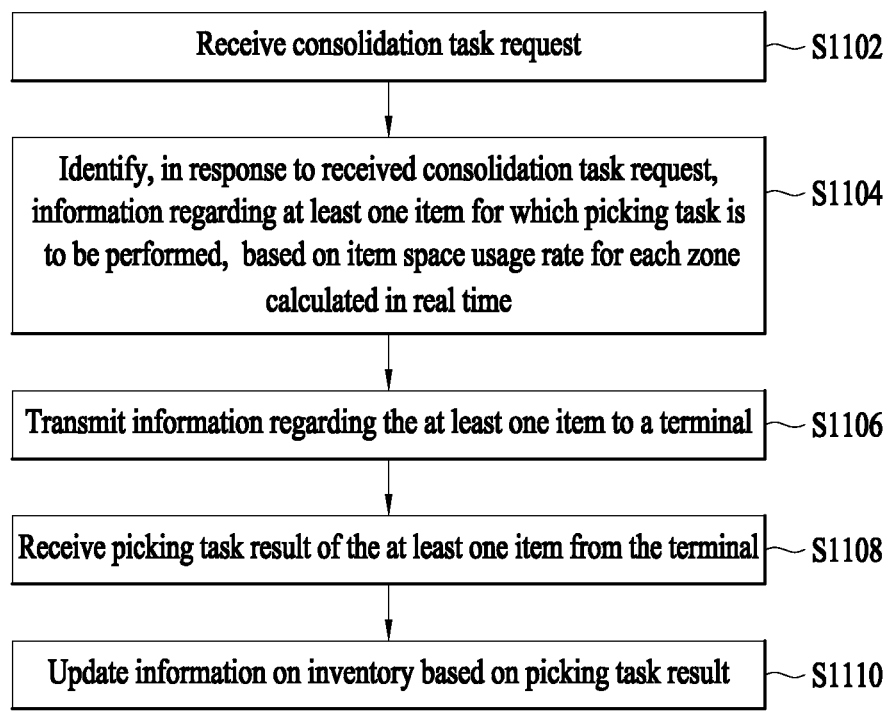
FIG. 11 is a flowchart illustrating an operation method of an electronic apparatus for inventory management according to an example embodiment of the present disclosure.
Figure 12:
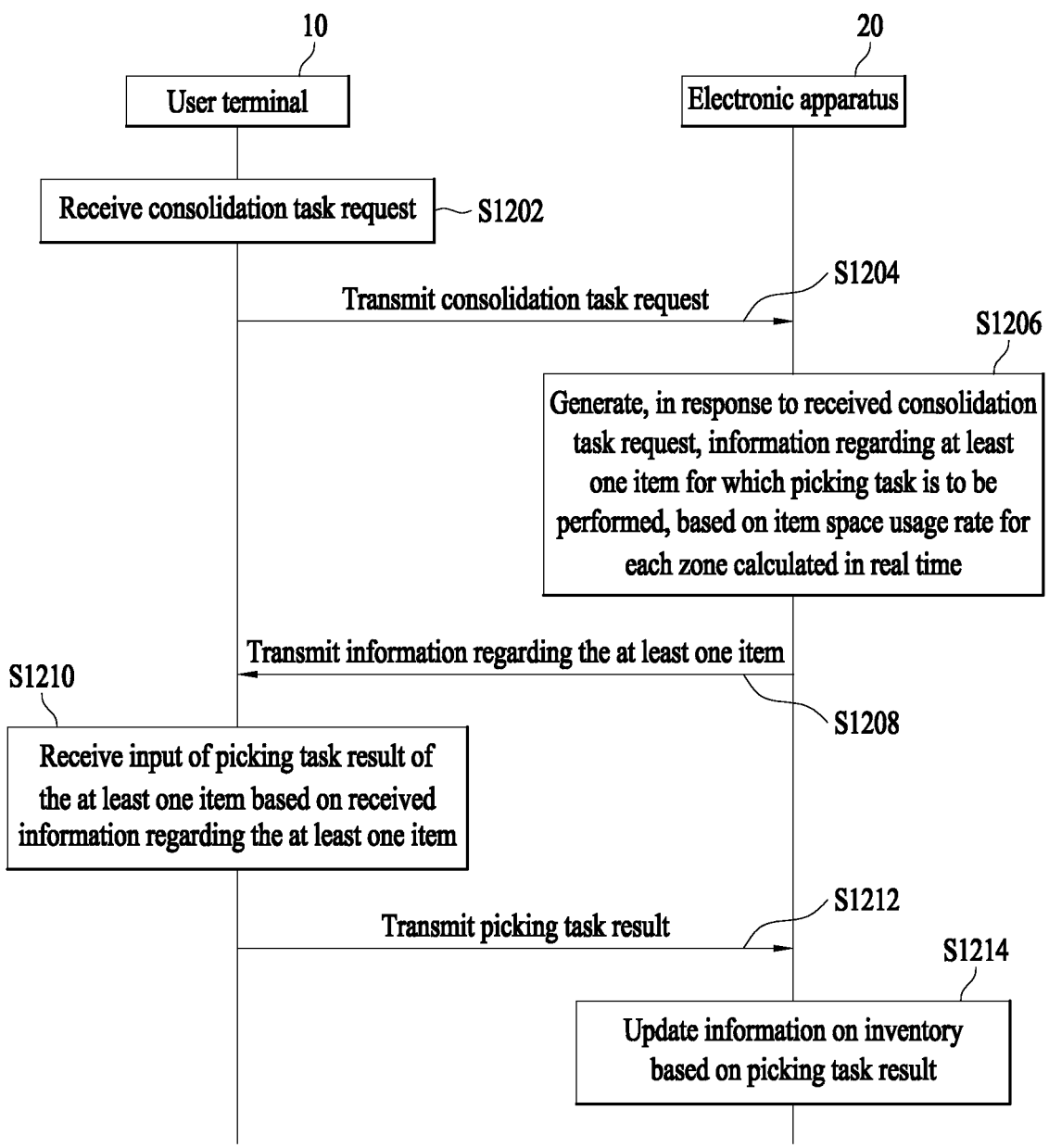
FIG. 12 is a flowchart illustrating an operation method of an inventory management system according to an example embodiment of the present disclosure.

FIG. 11 is a flowchart illustrating an operation method of the electronic apparatus 20 for inventory management according to an example embodiment of the present disclosure and FIG. 12 is a flowchart illustrating an operation method of an inventory management system according to an example embodiment of the present disclosure.

The user terminal 10 may receive a consolidation task request in operation S1202 and transmit the consolidation task request to the electronic apparatus 20 in operation S1204, so that the electronic apparatus 20 may receive the consolidation task request in operation S1102. Specifically, the electronic apparatus 20 may receive information on a plurality of locations in which a consolidation task is required, or receive a target value of an item space usage rate for each zone.

Thereafter, in response to the received consolidation task request, the electronic apparatus 20 may identify information on at least one item on which a picking task is to be performed, based on an item space usage rate for each zone calculated in real time in operation S1104 of FIG. 11 and operation S1206 of FIG. 12. In an example, when the electronic apparatus 20 receives the information on the plurality of locations in which the consolidation task is required, the electronic apparatus 20 may compare an item space usage rate for each of the plurality of locations to a predetermined value, thereby generating information on at least one item on which a picking task is to be performed. In another example, when the electronic apparatus 20 receives the target value of the item space usage rate for each zone, the electronic apparatus 20 may compare the item space usage rate for each zone to the target value, thereby generating information on or regarding at least one item on which a picking task is to be performed. A space usage rate of the at least one item may be a ratio of a volume of a space in which an item is placed in a zone to a volume of a space capable of receiving an item in the zone, and may be a value changed in accordance with a picking task being performed on the item in the zone. Also, the information on the at least one item may include identification information, quantity information, and location information of the item on which the picking task is to be performed.

Subsequently, the electronic apparatus 20 may transmit the information on the at least one item to the user terminal 10 in operation S1106 of FIG. 11 and operation S1208 of FIG. 12. The user terminal 10 may output the information on the at least one item and verify whether the at least one item is picked by a quantity corresponding to a target quantity.

Thereafter, the user terminal 10 may receive a picking task result of the at least one item from a user based on the received information on the at least one item in operation S1210 and transmit the received picking task result of the at least one item to the electronic apparatus 20 in operation S1108 of FIG. 11 and operation S1212 of FIG. 12. Also, the electronic apparatus 20 may update information on inventory based on the picking task result in operation S1110 of FIG. 11 and operation S1214 of FIG. 12.

Figure 13:
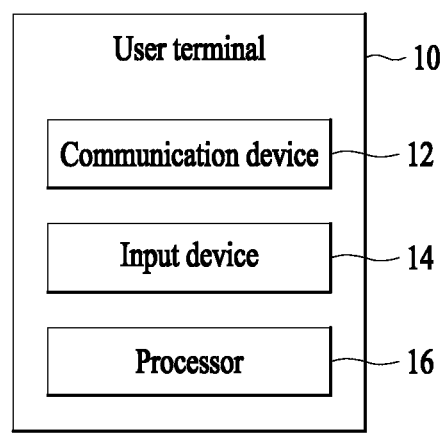
FIG. 13 is a block diagram illustrating a user terminal according to an example embodiment of the present disclosure.

FIG. 13 is a block diagram illustrating a user terminal according to an example embodiment of the present disclosure.

The user terminal 10 may include a communication device 12, an input device 14, and a processor 16. The components illustrated in FIG. 13 are not essential to implement a terminal, and thus, it will be apparent to those skilled in the art that more or fewer components may be employed.

The communication device 12 may communicate with an external electronic apparatus using wired or wireless communication technology. The external electronic apparatus may be a terminal or a server. Also, the communication device 12 may use communication technologies such as global system for mobile communication (GSM), code division multi access (CDMA), long term evolution (LTE), 5G, wireless LAN (WLAN), Wi-Fi, Bluetooth™, radio frequency identification (RFID), IrDA communication, ZigBee, and NFC, for example.

The communication device 12 may transmit a consolidation task request to the electronic apparatus 20. The communication device 12 may receive information on at least one item on which a picking task is to be performed from the electronic apparatus 20. The communication device 12 may transmit a received picking task result of the at least one item to the electronic apparatus 20. The communication device 12 may transmit error information to the electronic apparatus 20 when an error occurs during the picking task.

The input device 14 may include a camera or an image input part for inputting an image signal, a microphone or an audio input part for inputting an audio signal, and a user input part (for example, a touch key, a push key (a mechanical key) and the like). In addition, the input device 14 may include one or more sensors configured to sense at least one of internal information of a mobile terminal, information on an environment in the surroundings of the mobile terminal, and user information. For example, the input device 14 may include at least one of a proximity sensor, an illumination sensor, a touch sensor, a motion sensor, a finger scan sensor, an optical sensor (for example, a camera), a microphone, and the like. Meanwhile, the mobile terminal of the present disclosure may utilize information obtained from at least two or more of these sensors.

The input device 14 may receive the consolidation task request from a user. The user terminal 10 may request to input identification information of a storage unit, identification information of a location, and identification information of an item through the input device 14 and identify the input identification information. For example, the user may scan the storage unit, and a barcode of a task location and item by using a camera. The input device 14 may receive a picking task result of the at least one item from the user. The input device 14 may receive an input of a quantity by which an item is picked or an input of terminating a consolidation task.

The controller 16 may control overall operations of the user terminal 10 and process data and signals. The processor 16 may control operations of the communication device 12 and the input device 14 to verify whether the at least one item is picked by a quantity corresponding to a target quantity.

Meanwhile, although not illustrated in FIG. 13, the user terminal 10 may further include a display. The display is to generate an output related to visual, auditory, tactile senses, and may include at least one of a display part, an audio output part, a haptic module, and an optical output part. The display may form a layer structure or an integrated structure with a touch sensor to implement a touch screen. The touch screen may also function as a user input part that provides an input interface between a mobile terminal and a user and simultaneously, provide an output interface between the mobile terminal and the user. According to an example embodiment, the display of the present disclosure may output information on at least one item to receive an input from the user.

Figure 14:
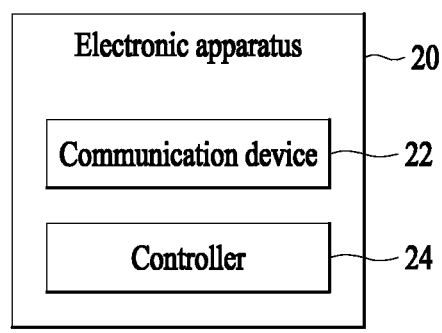
FIG. 14 is a block diagram illustrating an electronic apparatus according to an example embodiment of the present disclosure.

FIG. 14 is a block diagram illustrating the electronic apparatus 20 according to an example embodiment of the present disclosure.

The electronic apparatus 20 of the present disclosure may include a communication device 22 and a controller 24. The components illustrated in FIG. 14 are not essential to implement an electronic apparatus, and thus, it will be apparent to those skilled in the art that more or fewer components may be employed.

The communication device 22 may communicate with an external electronic apparatus using wired or wireless communication technology as described with reference to the communication device 12 of FIG. 13. The communication device 22 may receive a consolidation task request from the user terminal 10. The communication device 22 may transmit information on at least one item to the user terminal 10. The communication device 22 may receive a picking task result of the at least one item from the user terminal 10.

The controller 24 may control an overall operation of the electronic apparatus 20 and process data and a signal. In response to the consolidation task request received from the communication device 22, the controller 24 may identify information on at least one item on which a picking task is to be performed, based on an item space usage rate for each zone calculated in real time. Also, the controller 24 may update information on inventory based on a received picking task result.

The apparatus described herein may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method operable by an electronic apparatus, the electronic apparatus comprising a processor, for inventory management, the method comprising:
receiving, by the electronic apparatus, from a user terminal via a network, inventory data, wherein the inventory data indicates a status of inventory located at a plurality of locations, wherein the inventory data comprises a plurality of inventory identifiers, wherein each inventory identifier of the plurality of inventory identifiers indicates a status of a particular portion of the inventory located at a particular location of the plurality of locations, wherein the user terminal scans the inventory to generate the plurality of inventory identifiers;
calculating, by the electronic apparatus, in real time, based on the inventory data, an inventory space usage rate for each location of the plurality of locations, wherein an inventory space usage rate for a first location of the plurality of locations comprises a ratio of a first volume of space in which an item is placed in the first location to a second volume of space capable of receiving the item in the first location;

automatically generating, by the electronic apparatus, a request to implement a consolidation task for the plurality of locations based on the inventory space usage rate for each location, wherein the consolidation task comprises a plurality of target values for the plurality of locations;

assigning, by the electronic apparatus, the consolidation task to the user terminal;

determining via the network, by the electronic apparatus, the user terminal accepted the request to implement the consolidation task;

identifying, by the electronic apparatus, in response to determining the user terminal accepted the consolidation task, a plurality of picking tasks based on comparing a corresponding inventory space usage rate for each location of the plurality of locations to a particular target value of the plurality of target values, wherein a picking task of the plurality of picking tasks comprises a task to move a particular portion of the inventory from the first location of the plurality of locations to a second location of the plurality of location;

transmitting, by the electronic apparatus, the picking task to the user terminal via the network, wherein the user terminal outputs the picking task via a display of the user terminal;

transmitting, by the electronic apparatus via the network, the picking task to an automated device, wherein the automated device facilitates execution of the picking task, wherein the automation device comprises one or more of a forklift, an elevator, a cart, a hand truck, a dolly or a robot;

in response to the user terminal outputting the picking task, receiving, by the electronic apparatus via the network, a result of the picking task from the user terminal, wherein the result of the picking task indicates a status of the execution of the picking task by the automated device; and updating, by the electronic apparatus, the inventory data for the first location and the inventory data for the second location based on the result of the picking task.

2. The method of claim 1, wherein the picking task comprises one or more of identification information, quantity information, and location information of the item on which the picking task is to be performed.

3. The method of claim 1, wherein the user terminal is configured to verify a quantity of the item associated with the picking task corresponds to a target quantity.

4. The method of claim 1, wherein the inventory space usage rate for the first location is modified based at least in part on the execution of the picking task.

5. The method of claim 1, wherein generating the request to implement the consolidation task comprises identifying a subset of inventory space usage rates for a subset of the plurality of locations, and identifying the plurality of picking tasks comprises generating information regarding the picking task.

6. The method of claim 1, wherein identifying the plurality of picking tasks comprises generating information regarding the picking task.

7. The method of claim 1, further comprising:
requesting the inventory data of the first location; and
in response to receiving an indication that the inventory data of the first location has not been received, requesting additional inventory data of a third location in which the inventory is located, the third location being different from the first location.

8. The method of claim 1, further comprising:
requesting the inventory data for the plurality of locations; and
in response to receiving an indication that the inventory data for at least one location of the plurality of locations has not been received, requesting additional inventory data, wherein the additional inventory data indicates a status of the inventory located at one or more additional locations.

9. The method of claim 1, further comprising:
determining a quantity of the inventory moved from the first location to the second location based at least in part on the result of the picking task; and
in response to determining that the quantity of the inventory does not correspond to a target quantity, requesting one or more of termination of the consolidation task or identification of a third location in which a portion of the inventory is located, the third location being different from the first location.

10. The method of claim 1, wherein the particular portion of the inventory comprises a first portion of the inventory, the method further comprising:
determining a quantity of the inventory moved from the first location to the second location based at least in part on the result of the picking task; and
in response to determining that the quantity of the inventory satisfies a target quantity, requesting one or more of termination of the consolidation task or identification of a second portion of the inventory.

11. A non-transitory computer readable recording medium comprising a computer program, which, when executed, causes an electronic apparatus, the electronic apparatus comprising a processor, to:

receive, by the electronic apparatus, from a user terminal via a network, inventory data, wherein the inventory data indicates a status of inventory located at a plurality of locations, wherein the inventory data comprises a plurality of inventory identifiers, wherein each inventory identifier of the plurality of inventory identifiers indicates a status of a particular portion of the inventory located at a particular location of the plurality of locations, wherein the user terminal scans the inventory to generate the plurality of inventory identifiers;

calculate, by the electronic apparatus, in real time, based on the inventory data, an inventory space usage rate for each location of the plurality of locations, wherein an inventory space usage rate for a first location of the plurality of locations comprises a ratio of a first volume of space in which an item is placed in the first location to a second volume of space capable of receiving the item in the first location;

automatically generate, by the electronic apparatus, a request to implement a consolidation task for the plurality of locations based on the inventory space usage rate for each location, wherein the consolidation task comprises a plurality of target values for the plurality of locations;

assign, by the electronic apparatus, the consolidation task to the user terminal;

determine, by the electronic apparatus via the network, the user terminal accepted the request to implement the consolidation task;

identify, by the electronic apparatus, in response to determining the user terminal accepted the consolidation task, a plurality of picking tasks based on comparing a corresponding inventory space usage rate for each location of the plurality of locations to a particular target value of the plurality of target values, wherein a picking task of the plurality of picking tasks comprises a task to move a particular portion of the inventory from the first location of the plurality of locations to a second location of the plurality of location;

transmit, by the electronic apparatus, the picking task to the user terminal via the network, wherein the user terminal outputs the picking task via a display of the user terminal;

transmit, by the electronic apparatus via the network, the picking task to an automated device, wherein the automated device facilitates execution of the picking task, wherein the automation device comprises one or more of a forklift, an elevator, a cart, a hand truck, a dolly or a robot;

in response to the user terminal outputting the picking task, receive, by the electronic apparatus via the network, a result of the picking task from the user terminal, wherein the result of the picking task indicates a status of the execution of the picking task by the automated device; and update, by the electronic apparatus, the inventory data for the first location and the inventory data for the second location based on the result of the picking task.

12. An electronic apparatus for inventory management, the electronic apparatus comprising:

a communication device configured to communicate with a user terminal via a network; and a controller comprising a processor, the controller configured to control the communication device, wherein the controller is configured to:

receive, by the electronic apparatus, from the user terminal via the network through the communication device, inventory data, wherein the inventory data indicates a status of inventory located at a plurality of locations, wherein the inventory data comprises a plurality of inventory identifiers, wherein each inventory identifier of the plurality of inventory identifiers indicates a status of a particular portion of the inventory located at a particular location of the plurality of locations, wherein the user terminal scans the inventory to generate the plurality of inventory identifiers;

calculate, by the electronic apparatus, in real time, based on the inventory data, an inventory space usage rate for each location of the plurality of locations, wherein an inventory space usage rate for a first location of the plurality of locations comprises a ratio of a first volume of space in which an item is placed in the first location to a second volume of space capable of receiving the item in the first location;

automatically generate, by the electronic apparatus, a request to implement a consolidation task for the plurality of locations based on the inventory space usage rate for each location, wherein the consolidation task comprises a plurality of target values for the plurality of locations;

assign, by the electronic apparatus through the communication device, the consolidation task to the user terminal;

determine, by the electronic apparatus through the communication device, the user terminal accepted the request to implement the consolidation task;

identify, by the electronic apparatus, in response to determining the user terminal accepted the consolidation task, a plurality of picking tasks based on comparing a corresponding inventory space usage rate for each location of the plurality of locations to a particular target value of the plurality of target values, wherein a picking task of the plurality of picking tasks comprises a task to move a particular portion of the inventory from the first location of the plurality of locations to a second location of the plurality of location;

transmit, by the electronic apparatus through the communication device, the picking task to the user terminal via the network, wherein the user terminal outputs the picking task via a display of the user terminal;

transmit, by the electronic apparatus through the communication device, the picking task to an automated device, wherein the automated device facilitates execution of the picking task, wherein the automation device comprises one or more of a forklift, an elevator, a cart, a hand truck, a dolly or a robot;

in response to the user terminal outputting the picking task, receive, by the electronic apparatus via the network through the communication device, a result of the picking task from the user terminal, wherein the result of the picking task indicates a status of the execution of the picking task by the automated device; and update, by the electronic apparatus, the inventory data for the first location and the inventory data for the second location based on the result of the picking task.

13. A method operable by a terminal, the terminal comprising a first processor, for inventory management, the method comprising:

receiving information regarding at least one item based on a comparison of an inventory space usage rate for each location of a plurality of locations calculated in real time from an electronic apparatus, wherein the terminal is configured to communicate with the electronic apparatus over a network, the electronic apparatus comprising a second processor, wherein the electronic apparatus calculates in real time, based on inventory data, the inventory space usage rate for each location of the plurality of locations, wherein an inventory space usage rate for a first location of the plurality of locations comprises a ratio of a first volume of space in which the at least one item is placed in the first location to a second volume of space capable of receiving the at least one item in the first location;

outputting the information regarding the at least one item via a display of the terminal;

scanning, by the terminal, inventory to generate a plurality of inventory identifiers, wherein each inventory identifier of the plurality of inventory identifiers indicates a status of a particular portion of the inventory located at a particular location of a plurality of locations;

transmitting, by the terminal via the network, the plurality of inventory identifiers to a communication device of the electronic apparatus;

receiving, by the terminal, from the communication device of the electronic apparatus via the network, a request to implement a consolidation task for the plurality of locations based on the inventory space usage rate for each location of the plurality of locations, wherein the consolidation task comprises a plurality of target values for the plurality of locations, wherein the consolidation task is based on the plurality of inventory identifiers;

transmitting, by the terminal via the network, a response to the request to implement the consolidation task to the communication device of the electronic apparatus via the network, wherein the response to the request to implement the consolidation task indicates that the terminal accepted the consolidation task;

receiving, by the terminal via the network, from the communication device of the electronic apparatus, a plurality of picking tasks via the network, based on comparing a corresponding inventory space usage rate for each location of the plurality of locations to a particular target value of the plurality of target values, wherein a picking task of the plurality of picking tasks comprises a task to move a particular portion of inventory from the first location of the plurality of locations to a second location of the plurality of location;

outputting, by the terminal, the picking task of the plurality of picking tasks via a display of the terminal;

transmitting, by the terminal, the picking task to an automated device, wherein the automated device facilitates execution of the picking task, wherein the automation device comprises one or more of a forklift, an elevator, a cart, a hand truck, a dolly or a robot;

in response to transmitting the picking task to the automated device, receiving, by the terminal, a result of the picking task, wherein the result of the picking task indicates a status of the execution of the picking task by the automated device; and transmitting, by the terminal via the network, to the communication device of the electronic apparatus, the result of the picking task, wherein the electronic apparatus updates inventory data for the first location and inventory data for the second location based on the result of the picking task.

* * * * *